(12) United States Patent
Eberl et al.

(10) Patent No.: US 11,635,410 B2
(45) Date of Patent: Apr. 25, 2023

(54) GAS CONCENTRATION DETECTION BY MEANS OF THERMOACOUSTIC SOUND WAVE

(71) Applicant: Infineon Technologies AG, Neubiberg (DE)

(72) Inventors: Matthias Eberl, Taufkirchen (DE); Franz Jost, Stuttgart (DE); Stefan Kolb, Unterschleissheim (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/446,507

(22) Filed: Aug. 31, 2021

(65) Prior Publication Data

US 2022/0074897 A1    Mar. 10, 2022

(30) Foreign Application Priority Data

Sep. 10, 2020    (DE) .................. 102020211401.3

(51) Int. Cl.
*G01N 29/24*    (2006.01)
*G01N 29/024*    (2006.01)

(52) U.S. Cl.
CPC ....... *G01N 29/2431* (2013.01); *G01N 29/024* (2013.01); *G01N 2291/021* (2013.01)

(58) Field of Classification Search
CPC .......... G01N 29/2431; G01N 29/4427; G01N 29/024; G01N 29/326; G01N 2291/021; G01N 2291/015; G01N 2291/02809
See application file for complete search history.

(56) References Cited

U.S. PATENT DOCUMENTS

| | | | | |
|---|---|---|---|---|
| 2,653,471 A | | 9/1953 | Clewell | |
| 3,922,912 A | * | 12/1975 | Bradbury | ................ G01P 13/02 |
| | | | | 73/861.95 |
| 5,698,795 A | * | 12/1997 | Elliott | ................... G01F 1/7084 |
| | | | | 73/861.95 |
| 2012/0186362 A1 | * | 7/2012 | Lee | ......................... G01F 1/667 |
| | | | | 73/861.27 |
| 2012/0312302 A1 | * | 12/2012 | Cardelius | .............. A61M 16/12 |
| | | | | 128/203.14 |
| 2018/0196015 A1 | * | 7/2018 | Lee | ...................... G01N 29/024 |
| 2019/0310229 A1 | | 10/2019 | Imai et al. | |
| 2019/0360975 A1 | * | 11/2019 | Eberl | ................. G01N 21/1702 |

FOREIGN PATENT DOCUMENTS

DE    102017211970 A1    1/2019
DE    102017128526 A1    6/2019
DE    102018206669 B3    10/2019

* cited by examiner

*Primary Examiner* — Suman K Nath
(74) *Attorney, Agent, or Firm* — Harrity & Harrity, LLP

(57) ABSTRACT

A gas sensor having a heater, a receiver, and a space arranged between the heater and the receiver, is described, the heater being configured to generate a thermoacoustic sound wave propagating through the space by using a stimulation signal. The receiver is in this case configured to receive the thermoacoustic sound wave that has propagated through the space and to convert it into a reception signal that has a time-of-flight-dependent shift with respect to the stimulation signal and therefore information relating to the gas concentration in the space.

17 Claims, 6 Drawing Sheets

GAS CONCENTRATION DETECTION BY MEANS OF THERMOACOUSTIC SOUND WAVE

CROSS REFERENCE TO RELATED APPLICATION

This application claims priority to German Patent Application No. 102020211401.3, filed on Sep. 10, 2020, the contents of which are incorporated by reference herein in their entirety.

TECHNICAL FIELD

The present disclosure relates to gas sensors and methods for determining a gas concentration using thermoacoustic sound waves. The present disclosure furthermore relates to robust H2 sensors that allow an integrated measurement of thermal conductivity, speed of sound and/or temperature.

BACKGROUND

Gas sensors are a class of sensors that are employed in many application fields. In the process industry, gas sensors may be used for process monitoring or for quality assurance, and in the field of safety technology gas sensors are used, for example, for explosion protection, poisoning protection or for the detection of leaks.

SUMMARY

Some aspects described herein provide robust gas sensors having a good integration potential and low costs.

Some aspects according to the present disclosure provide a gas sensor having a heater, a receiver, and a space arranged between the heater and the receiver. The heater is configured to generate a thermoacoustic sound wave propagating through the space by using a stimulation signal. The receiver is in this case configured to receive the thermoacoustic sound wave that has propagated through the space and to convert it into a reception signal that has a time-of-flight-dependent shift with respect to the stimulation signal and therefore information relating to the gas concentration in the space.

Further aspects according to the present disclosure provide a method for determining a gas concentration. The method comprises applying a stimulation signal to a heater in order to generate a thermoacoustic sound wave that propagates through a space arranged between the heater and a receiver, and receiving the thermoacoustic sound wave at the receiver in order to generate a reception signal. The method furthermore comprises determining a time-of-flight-dependent shift between a heater signal and the reception signal, and determining the gas concentration in the space by using the time-of-flight-dependent shift that has been determined.

Some aspects according to the present disclosure are based on the central idea that a time-of-flight-dependent shift of a reception signal with respect to a stimulation signal, and therefore information relating to a gas concentration in a space, may be detected in such a way that the structures used may furthermore be used to detect a further parameter that may contain information relating to a gas to be detected. In this case, by using the stimulation signal, a heater generates a thermoacoustic sound wave which, after propagating through the space having the gas concentration to be detected, is converted by the receiver into the reception signal. The time-of-flight-dependent shift may, for example according to FIG. 3, be due to different speeds of sound of the thermoacoustic sound wave as a function of the gas concentration in the space. For example, such a method may be used particularly advantageously for gases that have a characteristic speed of sound, for example hydrogen or helium (see for example FIG. 3). In other words, the speed of sound of the thermoacoustic sound wave may be used to determine the gas concentration based on the relationship between the gas concentration and the speed of sound.

The stimulation signal may, for example, be a high-frequency signal (for example in the region of 10 kHz). The stimulation signal may furthermore be a periodic stimulation signal or a pulse, or a sequence of pulses. In the case of an individual pulse, for example, a simple measurement of the time of flight of the pulse may be carried out. In the case of a periodic stimulation signal, the time-of-flight-dependent shift may be a phase offset of the thermoacoustic sound wave due to the gas-dependent speeds of sound in the space. Furthermore, superposition of frequencies in a short pulse, with subsequent time-of-flight measurement, is also possible.

Since according to the disclosure a thermoacoustic sound wave is generated by a heater, the structures used, for example the heater, may furthermore be used to detect a further parameter which may contain information relating to a gas to be detected, for example the thermal conductivity. Therefore, some examples of the disclosure make it possible to detect a plurality of parameters in an integrated sensor.

By the concept according to the disclosure with the generation of the thermoacoustic sound wave by the heater, a corresponding gas sensor may be particularly robust and failsafe, for example because of moving parts being avoided. In contrast to the generation of a sound wave by a membrane, for example, besides a lower likelihood of mechanical failure, a heater may furthermore, for example, be produced more economically.

Furthermore, a gas sensor according to the disclosure allows evaluation of the reception signal with low calculation outlay since the determination of the time-of-flight-dependent shift may be carried out with a simple calculation operation and, particularly in systems having low calculation capacities, the evaluation of the time-of-flight-dependent shift may for example comprise only a determination of the signal time of flight, for example of a pulse signal generated by the heater.

BRIEF DESCRIPTION OF THE DRAWINGS

Some examples according to the present disclosure will be explained in more detail below with reference to the appended figures. In respect of the schematic figures represented, it should be pointed out that the functional blocks represented are to be understood both as elements or features of the device according to the disclosure and as corresponding method steps of the method according to the disclosure, and corresponding method steps of the method according to the disclosure may also be derived therefrom. In the figures.

DETAILED DESCRIPTION

Before examples of the present implementation are explained in more detail below with the aid of the drawings, it should be pointed out that elements, objects and/or structures that are identical or functionally equivalent or have the same effects are provided with the same or similar references in the various figures, so that the descriptions of these elements which are presented in different examples are interchangeable with one another, or may be applied to one another.

A further important application field for gas sensors is the automobile industry. Despite solutions such as a lambda probe in gasoline engines, there are challenges in the field of gas sensor technology, particularly in respect of vehicles with fuel cells.

Because of the increasing proliferation of the fuel cell in the automotive sector as well, the need for suitable sensor technology, for example monitoring and control, may increase. Since this may be in this case a safety-relevant component of the system, the requirements may be very high in order to bring a long-term, stable, reliable and nevertheless economical gas sensor, for example a hydrogen sensor, onto the market.

To this end, gas sensors may be adapted to the respective properties of a gas to be detected. In the case of hydrogen, these properties may comprise the following aspects: Hydrogen may, for example, form the H2 state only under atmospheric conditions.

For example because of its property as the smallest atom, hydrogen may exhibit rapid effusion and diffusion, which may lead to a change in the chemical and physical properties of a carrier material.

Hydrogen may be chemically very active so that it forms a strongly reducing element, for example a reducing agent.

Hydrogen may have a flammability in limits of 4-75% or 18-59%.

Figure 3:
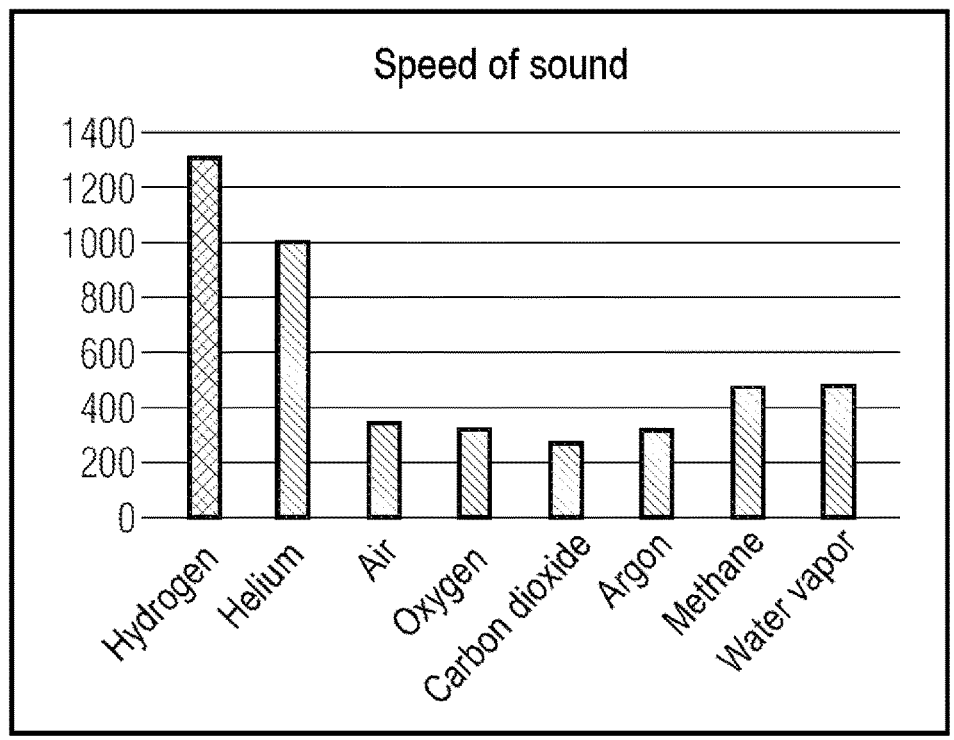
FIG. 3 shows a plot of speeds of sound for different gases.
Figure 4:
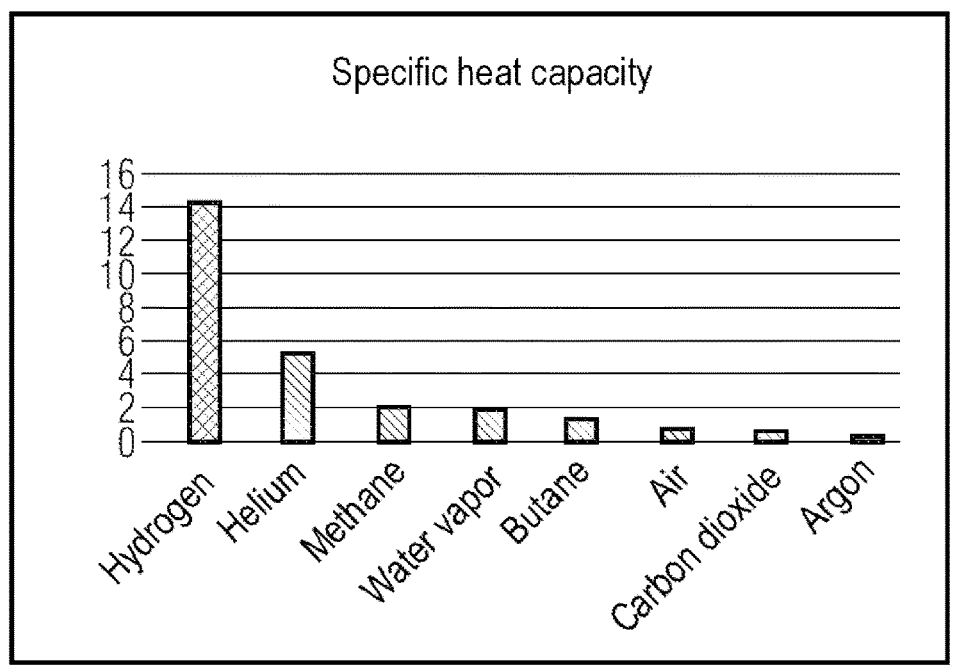
FIG. 4 shows a plot of specific heat capacities for different gases.
Figure 5:
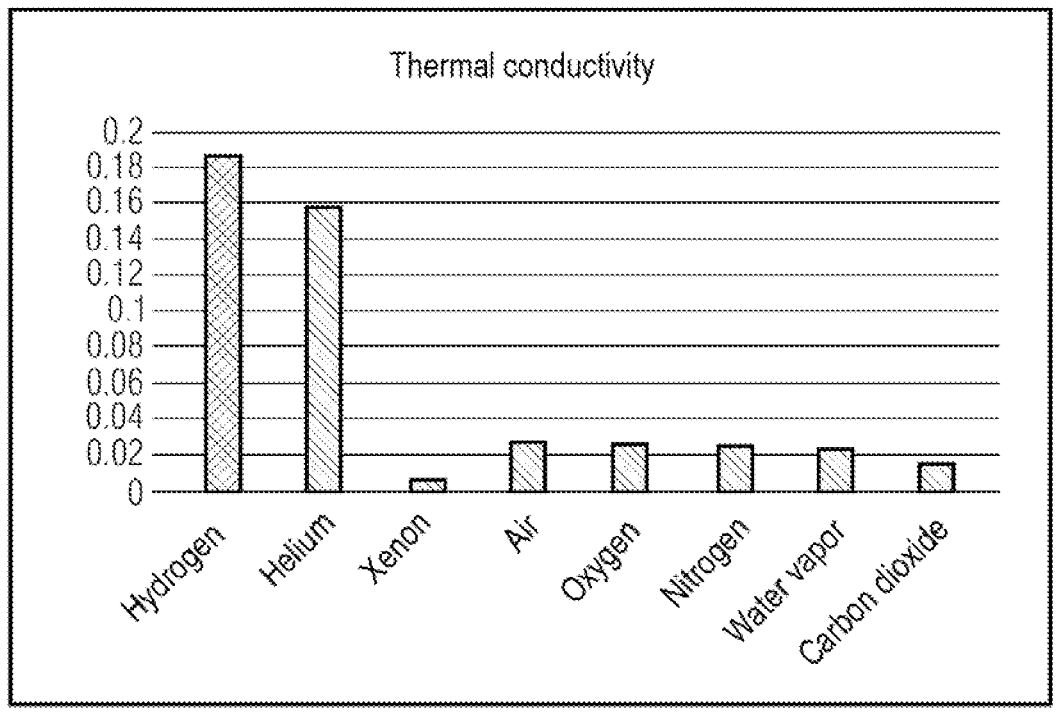
FIG. 5 shows a plot of thermal conductivities for different gases.

Further properties of gases, inter alia hydrogen, are plotted in FIGS. 3-5.

FIG. 3 shows a plot of different speeds of sounds, for example for different gases.

FIG. 4 shows a plot of specific heat capacities, for example for different gases.

FIG. 5 shows a plot of thermal conductivities, for example for different gases.

It should be pointed out that gas sensors according to the disclosure, as presented below, may be based on one or more of the above-described properties, or property differences, or aspects. Individual properties or aspects, for example of hydrogen, may be employed in gas sensors according to the disclosure.

Some conventional gas sensors, for example hydrogen gas sensors, or their basic principles, will be described below. Furthermore, the following description may provide a technological overview of gas sensors.

Previous solutions for sensors, for example hydrogen gas sensors, comprise sensors that are based, for example, on physical properties or on chemical properties.

Such a physical property may be the thermal conductivity. The thermal conductivity may, for example, be measured by the 3 omega method. In this case, temperature oscillations may be measured, for example based on periodic heating being introduced, and the thermal conductivity may be determined from its frequency dependency. The stimulation may be carried out with a high frequency, for example in the kilohertz range. The detection of a harmonic, for example the third harmonic, may in turn be a measure of the gas thermal conductivity. In order to measure the thermal conductivity, a constant power may furthermore be applied to a large contact area, the contact area being cooled differently as a function of the gas concentration because of the thermal conductivity which depends on the gas concentration, so that the gas concentration may be deduced based on the thermal conductivity.

A further physical property may be an acoustic property, or acoustics. A corresponding sensor may in this case use the change in the speed of sound with ultrasound TOF (time of flight method). In this case, an emitted ultrasound signal may be reflected at a gas to be detected and the gas may be deduced from the time of flight, or signal time of flight.

Gas sensors based on chemical properties may comprise sensors with catalytic combustion. These may comprise coils, which are coated (for example with Pt), in a ceramic matrix. Furthermore, a temperature rise may take place because of the catalytic combustion. Such a sensor may comprise a detector element, which comprises the catalytic material, and a compensation element. In this case, a combustible gas to be detected may be combusted at the detector element and cause a rise in the temperature, the resistance of the detector element increasing. In the compensation element, the temperature and resistance remain approximately constant. The evaluation of the detector element and compensation element may be carried out with a bridge circuit. From the difference between the two elements, the gas, or the gas concentration, may then be deduced.

Further gas sensors based on chemical properties may comprise semiconductors. Because of a gas, electrical properties of for example integrated semiconductor elements may change so that, for example, the gas, or its concentration, may be deduced with the aid of the changes in the electrical properties.

Semiconductors, or semiconductor elements, may in this case comprise for example the following:

Schottky diodes, for example having a semiconductor substrate, an insulator layer, and a metal layer applied on the insulator layer, p-n junction diodes, for example having an n-doped semiconductor substrate, a p-doped semiconductor layer, and a metal layer applied on the p-doped semiconductor layer, MOS transistors, for example having an n-doped semiconductor substrate, an S (for example source) terminal and a D (for example drain) terminal in the semiconductor substrate, and an insulator layer applied on the n-doped semiconductor substrate and the S and D terminals, and a metal layer applied on the insulator layer.

Gas sensors based on chemical properties may furthermore be based on chemical-resistive principles or effects (or chemi-resistive, MOX, or metal-oxide semiconductor gas sensors). Such gas sensors may be based on the resistance change of a chemically active coating. In this case, electrons may be donated or accepted, or materials and substances that form donors or acceptors for electrons may be used. For example, some materials change their conductivity in the presence of a gas. For example, a material may adsorb oxygen molecules on its surface. In this case, electrons may be donated by the material to the oxygen atoms until an equilibrium is established. A reduced gas to be detected may be oxidized by the adsorbed oxygen, so that an electron is donated back to the material and the conductivity of the material thus changes. By the resistance or conductivity change, for example, the gas or its concentration may then be deduced.

Gas sensors based on chemical properties may furthermore comprise Pd-based sensors. Such sensors may be based on the change in mechanical properties, for example the mechanical tension, the stress, and/or the dimension or the sizes, by absorption of a gas to be detected.

Furthermore, previous solutions are based, for example, on a sensor system having a plurality of discrete sensors (for example moisture sensor, temperature sensor, thermal conductivity sensor, MOX sensor), the output signals of which are correlated in a central control unit.

In respect of the comments above, in should be pointed out that a gas sensor according to the disclosure may comprise individual or several aspects, properties or functionalities of the sensors or sensor principles described above.

Figure 1:
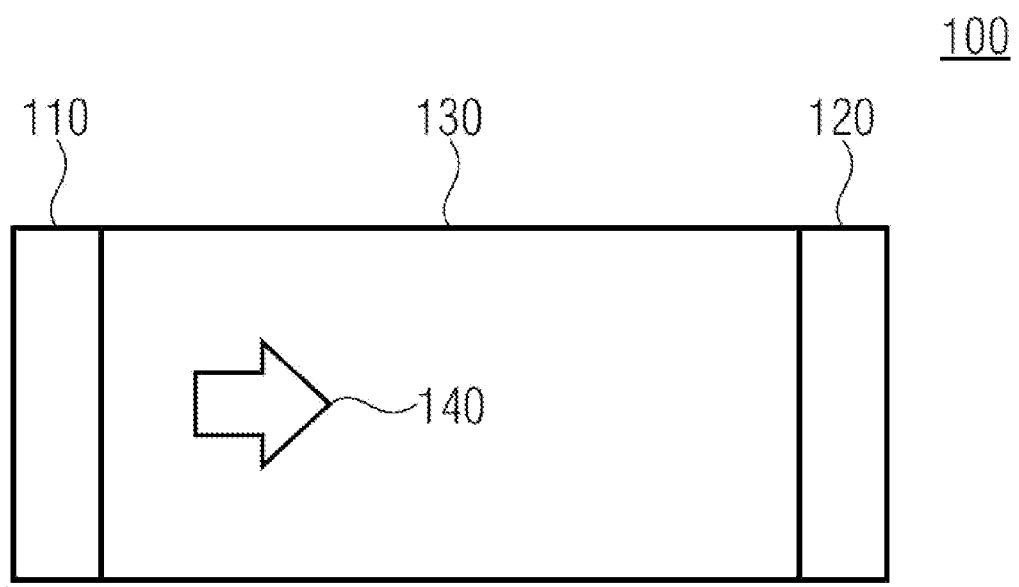
FIG. 1 shows a schematic side view of an example of a gas sensor according to the present disclosure.

FIG. 1 shows a schematic side view of an example of a gas sensor according to the present disclosure.

FIG. 1 shows a gas sensor 100 having a heater 110 and a receiver 120. A space 130, in which a thermoacoustic sound wave 140 propagates, is arranged between the heater 110 and the receiver 120.

The receiver 120 may comprise a microphone or a microphone membrane and/or a temperature sensor, for example having a thin membrane. The heater 110 may be a heating structure, for example a conductive track, formed in a MEMS element.

By using a stimulation signal, the heater 110 generates a thermoacoustic sound wave 140 that propagates through the space 130. Because of gases or gas concentrations and the speed of sound thereby modified in the space 130, a time-of-flight-dependent shift, or delay, of the thermoacoustic sound wave 140 takes place. The thermoacoustic sound wave 140 is received in the receiver 120 and converted into a reception signal. The time-of-flight-dependent shift of the thermoacoustic sound wave 140 leads to a time-of-flight-dependent shift of the reception signal in comparison with the stimulation signal. Information relating to the gas concentration in the space 130 may be determined by evaluating the time-of-flight-dependent shift.

Before the detailed explanation of the other figures, other examples and aspects and/or variants of examples and aspects according to the present disclosure will initially be described below.

In some further aspects according to the present disclosure, the receiver comprises a microphone. The microphone may be a microphone membrane. Microphones form well-established sensor elements, the signals of which may be amplified and analyzed by simple methods for subsequent further processing. Furthermore, besides the extraction of frequency information or phase information, for example for determining the time-of-flight-dependent shift, microphones also make it possible to evaluate amplitude information, for example in respect of signal attenuation, so that further analyses, for example relating to a gas-dependent thermal conductivity of the space arranged between the heater and the receiver, may be made possible.

In some further aspects according to the present disclosure, the receiver comprises a temperature sensor. The temperature sensor may be a thin membrane. Such a temperature sensor may furthermore comprise a temperature-sensitive sensor element, for example in the form of a strip, or a strip inside an opening of a sensor structure of the temperature sensor. Such a sensor element may be configured as a conductive track with a temperature-dependent resistance, so that an impinging thermoacoustic wave may lead to heating and therefore a detectable resistance change.

By the use of a temperature sensor, determination of the thermal conductivity of the space arranged between the heater and the receiver may be made possible. The thermal conductivity of the space is in this case dependent on a gas concentration in the space, so that the gas concentration may be inferred by determining the thermal conductivity, in addition to determining the gas concentration by determining the speed of sound using determining a time-of-flight-dependent shift by the temperature sensor, or independently. Furthermore, temperature sensors may be configured without moving elements, so that they may for example be more robust or failsafe in comparison with a microphone membrane.

In some aspects according to the present disclosure, the gas sensor comprises a gas concentration determination circuit that is configured to determine a phase shift between the reception signal and a heater signal or, based on the reception signal, a time of flight of the thermoacoustic wave through the space, which are respectively a measure of the gas concentration in the space.

For the case of a periodic heater signal, the gas concentration determination circuit may comprise a phase detector in order to determine a time-of-flight-dependent shift between the heater signal and the reception signal in the form of a phase shift.

In some alternative aspects, the heater signal may be a pulse or a pulsed signal. In this case, the gas concentration determination circuit may determine the time of flight of the signal based on the time offset between the reception signal and the heater signal, or based on the reception signal and time information.

The time information may be the time at which the pulse, or the pulsed signal, is emitted, so that with information made available by the reception signal relating to the arrival time of the signal, the time difference between the emission and reception of the pulse, or the pulsed signal, and therefore the signal time of flight or the time-of-flight-dependent shift, may be determined.

The gas concentration determination circuit may be integrated into the gas sensor, so that the gas sensor may emit a signal that indicates the gas concentration. The gas concentration determination circuit may also be arranged outside the sensor, so that the gas sensor may be configured to output a signal that makes it possible to determine the gas concentration.

By the gas concentration determination circuit, it is possible to use a relationship between the speed of sound of a thermoacoustic wave and a gas concentration, see for example FIG. 3. In some aspects, for gases with a characteristic speed of sound, a measure of the gas concentration may therefore be determined with, for example, a low error susceptibility.

In some aspects according to the present disclosure, the heater signal is the stimulation signal or a temperature signal that indicates a temperature of the heater. By using the stimulation signal as the heater signal, a signal is made available for evaluation without further outlay, for example in respect of further hardware. The temperature signal may furthermore be used to detect a thermal conductivity of the space adjacent to the heater. If the possibility of detecting the temperature of the heater is available, the accuracy of the evaluation may thereby be improved since the measurement may, for example, lessen the effect of modeling inaccuracies or tolerances. For example, the thermoacoustic sound wave which is emitted by the heater may thus under ideal conditions be calculated as a function of the stimulation signal, so that with the reception signal it is possible to calculate back to a change of the thermoacoustic sound wave due to a gas concentration. Because of modeling inaccuracies or tolerances of the heater, for example, this relationship may not correspond to the ideal conditions, for example standard conditions, so that a calculated emitted thermoacoustic sound wave does not correspond to the thermoacoustic sound wave actually emitted. A measurement of the temperature of the heater may therefore reduce uncertainties.

Some aspects according to the present disclosure comprise gas sensors in which the electrical resistance of the heater is temperature-dependent, and which are configured to generate the temperature signal as a function of the electrical resistance of the heater. The temperature dependency of the electrical resistance of the heater may for example be determined a priori, so that the actual determination of the temperature of the heater during operation may, for example, be performed with a simple current or voltage measurement. In some aspects, a current is applied to detect a voltage. In some aspects, a voltage is applied to detect a current. For example, by storing a temperature/current or temperature/voltage table, the temperature of the heater may be determined without, or with little, calculation outlay.

In some aspects according to the present disclosure, the gas sensor furthermore comprises a thermal conductivity determination circuit that is configured to determine the thermal conductivity of the space, which depends on the gas concentration in the space, by using the heater signal.

For the case in which the heater signal is a temperature signal that indicates a temperature of the heater, the determination of the thermal conductivity may be carried out based on the heat energy or heat power radiated by the heater. The temperature of the heater is dependent on the heat radiated. The heat energy or heat power that is radiated is in turn dependent on the thermal conductivity of the space. With known material and geometrical information of the heater and the space, for example, the thermal conductivity may therefore be deduced by using the temperature of the heater. In the event of strong heating of the heater, for example, there may be a low thermal conductivity in the space, and there may a high thermal conductivity in the event of weak heating.

In other words, for example, a known power may be applied to the heater. The heat energy or heat power radiated may be deduced from the measurement of the temperature of the heater, and the thermal conductivity in the space may thereby be deduced.

As an alternative or in addition, with knowledge of the stimulation signal, and for example a model of the heater, an expected temperature of the heater may be inferred and compared with the actual temperature of the heater. The heat radiated and therefore the thermal conductivity of the space may be deduced therefrom.

In further aspects, the amplitude of the thermoacoustic sound wave received in the receiver may be determined and compared with the corresponding initial amplitude of the thermoacoustic sound wave emitted by the heater, for example calculated using the relationship of the thermoacoustic sound wave with the stimulation signal or determined from an associated temperature signal of the heater, so as to draw conclusions about the thermal conductivity of the space.

Furthermore, the temperature signal may be used with further known methods, for example with the 3 omega method, so as to draw conclusions about the thermal conductivity of the space.

The thermal conductivity determination signal may be either integrated into the gas sensor or arranged outside the sensor, so that the gas sensor may be configured to output a signal that indicates the thermal conductivity or makes it possible to determine the thermal conductivity.

Besides determining the speed of sound, determining the thermal conductivity provides a possibility of determining gases or gas concentrations. By determining the thermal conductivity in addition to determining the speed of sound, it is possible to produce a redundant and therefore particularly robust gas sensor, which may for example be used particularly advantageously in safety-critical applications. Besides using the stimulation signal to determine the thermal conductivity, the temperature signal may also be used in addition or as an alternative.

In some aspects according to the present disclosure, the gas sensor comprises a driver circuit that is configured to apply the stimulation signal to the heater. The driver circuit may be configured to apply various stimulation signals to the heater, for example pulses or periodic stimulation signals. Furthermore, the driver circuit may be configured to change between different stimulation signals, for example in order to allow different types of evaluation, in order, for example, to reduce error sources in the transmission or the evaluation. Furthermore, the driver circuit may be configured to generate the stimulation signal.

In some aspects according to the present disclosure, at least the heater, the receiver, and the space arranged between the heater and the receiver, are integrated into a microsystem or MEMS (Micro-Electro-Mechanical Systems) system. Microsystems or MEMS systems may in this case comprise systems having dimensions in the micrometer range for less, for example having dimensions of less than 100 µm or less than 1 µm. Systems whose structures have dimensions in the nanometer range, which are also referred to as NEMS systems (e.g., nanoelectromechanical systems) are therefore also to be understood as microsystems or MEMS systems here.

MEMS systems furthermore comprise systems having electrical and mechanical components, this also meaning immobile mechanical components. In general, some examples according to the present disclosure comprise gas sensors that are integrated or partially integrated into microsystems or MEMS systems, in which case corresponding systems need not necessarily comprise moving elements.

Such systems may furthermore be produced by using one or more wafers, for example Si or Si—O wafers, bulk micromechanics, or surface micromechanics. For example, the structures may be produced with semiconductor technology methods in the nanometer and/or micrometer range, in which case the structures may also comprise materials other than semiconductors. Furthermore, the thermal conductivity determination circuit and/or the gas concentration determination circuit and/or driver circuit may likewise be integrated. Some aspects according to the present disclosure therefore comprise integrated microstructures, or microstructures with an integrated or partially integrated gas sensor, or with integrated elements or sub-elements of the gas sensor.

Miniaturization of the gas sensor, or of parts of the gas sensor, may be promoted by a high level of integration. By an integrated design, it is furthermore possible to save costs and furthermore provide total solutions with comprehensive functionality.

In some aspects according to the present disclosure, the microsystem or MEMS system comprises a first terminal for application of the stimulation signal to the heater and a second terminal for output of the reception signal.

By such a selection of the interfaces, good modularizability of the gas sensor or of the overall system may be provided. In this way, depending on the application, for example different driver circuits may be used to generate the stimulation signal and/or different circuits may be used to analyze the reception signal. Furthermore, simple integration into a superordinate system may be made possible by such a concept.

In some aspects of the present disclosure, the heater is arranged on a first side of a cavity in the microsystem, and the receiver comprises a membrane that is arranged at a distance from the heater on a second side of the cavity in the microsystem or MEMS system. The second side of the cavity may, for example, be a side opposite to the first side of the cavity.

By such an arrangement of the heater and the membrane, for example despite limited installation space of the microsystem or MEMS system, a good sensitivity of the gas sensor may be achieved since, for example, a path that is as long as possible, taking the available installation space into account, needs to be travelled by the thermoacoustic sound wave before impinging on the membrane. In this way, for example, the influence of a gas in the cavity on the thermoacoustic sound wave may be made possible to a sufficient extent, for example with a view to a signal delay or a reduction of the signal amplitude, in order to be able to achieve a meaningful result for the gas concentration.

In some aspects of the present disclosure, the heater signal is a periodic signal and the determination of the time-of-flight-dependent shift comprises a determination of a phase shift between the reception signal and the heater signal. The stimulation with a periodic heater signal may, for example, be carried out energetically favorably by a tuned circuit, so that a gas sensor according to the disclosure may have a low energy requirement.

In some aspects of the present disclosure, the determination of the time-of-flight-dependent shift comprises a determination of a time of flight of the thermoacoustic sound wave through the space. By determining the time of flight of the thermoacoustic sound wave, it is possible to deduce the speed of sound and therefore the gas concentration. Furthermore, by analysis of the thermoacoustic sound wave a possible error source in the conversion of the thermoacoustic sound wave into a reception signal may be reduced or avoided.

Further aspects of the present disclosure will be described below with the aid of the further figures.

Figure 2:
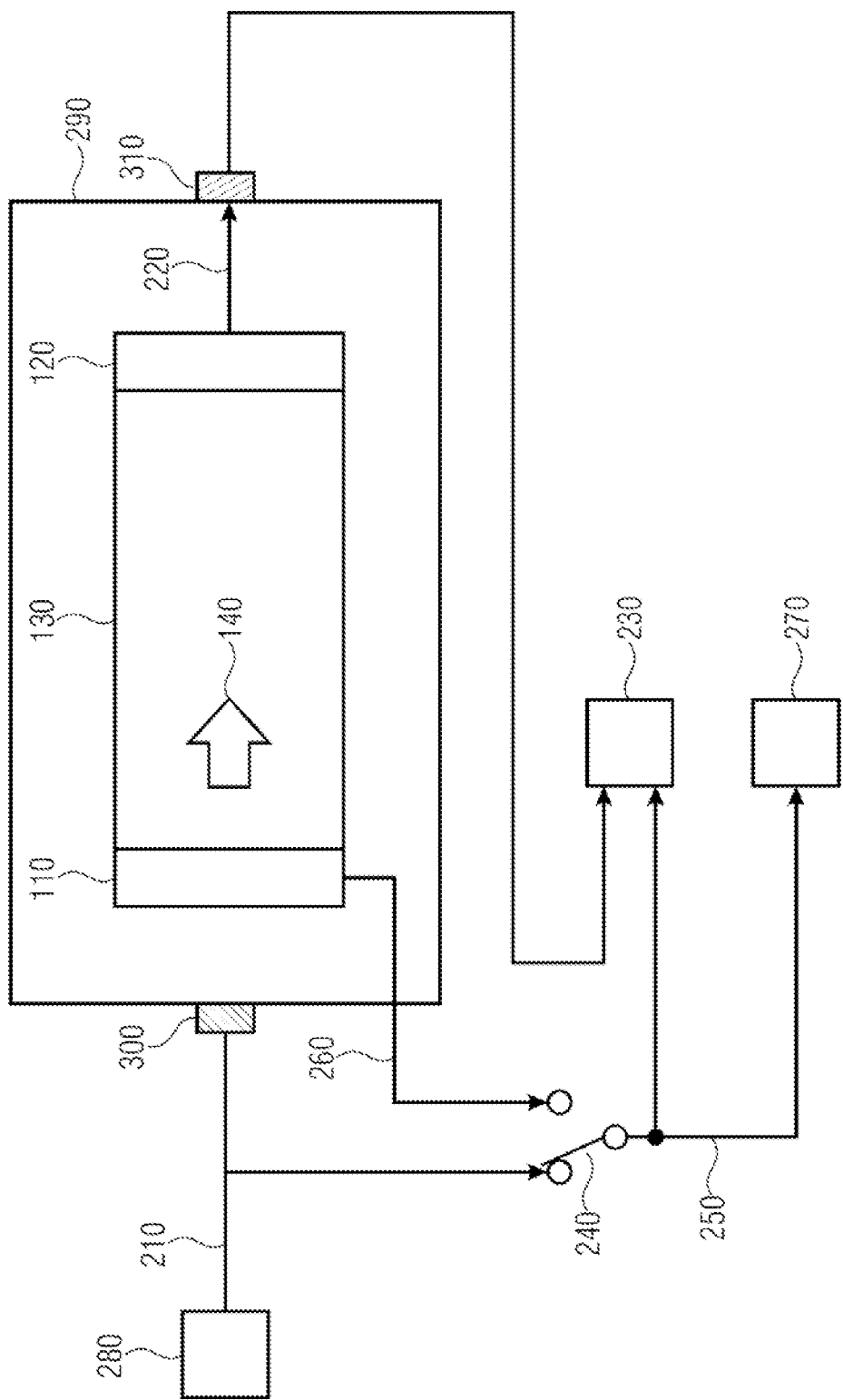
FIG. 2 shows a schematic side view of an extended example of a gas sensor according to the present disclosure.

FIG. 2 shows a schematic side view of an extended example of a gas sensor according to the present disclosure.

FIG. 2 shows the arrangement in FIG. 1, which comprises the heater 110, the receiver 120, which may comprise a microphone and/or a temperature sensor, and the space 130 arranged between the heater and the receiver, as well as the thermoacoustic sound wave 140, a stimulation signal 210 and a reception signal 220. Furthermore shown are a gas concentration determination circuit 230 as well as the associated respective signals, based on which the determination of the phase shift or the time of flight is carried out. In order to determine the phase shifts or the time of flight of the thermoacoustic sound wave, a reception signal 220 and the heater signal 250 may be employed here. In some aspects, time information may be used instead of the heater signal in order to determine the time of flight.

The heater signal 250 may comprise the stimulation signal 210 or the temperature signal 260, which indicates the temperature of the heater 110. These possibilities for the heater signal 250 are indicated in the figure by a signal switch 240. The signal switch 240 is in this case used merely to illustrate the possible signal inputs of the gas concentration determination circuit 230, so that in some aspects only one of the two signal paths may be formed, or so that both signal paths may also, for example, be formed.

FIG. 2 furthermore shows a thermal conductivity determination circuit 270 for determining the thermal conductivity of the space 130. The input signal of the thermal conductivity determination circuit 270 is the heater signal 250. In some aspects of the sensor shown in FIG. 2, the thermal conductivity determination circuit 270 may be omitted.

Furthermore, FIG. 2 shows a driver circuit 280, as well as a microsystem or MEMS system 290 into which the heater 110, the receiver 120 and the space 130 between the heater and the receiver are integrated. In this case, it should however be pointed out that further elements may also be integrated into the microsystem or MEMS system 290, for example the gas concentration determination circuit 230 and/or the thermal conductivity determination circuit 270 and/or the driver circuit 280. The microsystem or MEMS system 290 furthermore comprises a first terminal 300 and a second terminal 310, the stimulation signal 210 being applied to the first terminal 300 and the reception signal 220 being output at the second terminal 310. In some examples in which further components are integrated into the microsystem or MEMS system 290, the terminals 300, 310 need not be provided.

The driver circuit 280 is configured to apply the stimulation signal 210 to the heater 110. The driver circuit 280 may in some examples furthermore generate the stimulation signal 210. The stimulation signal 210 may be individual pulses, a sequence of pulses, a superposition of frequencies in a short pulse, or periodic, for example continuous, signals.

The stimulation signal 210 may have a frequency in the kilohertz (kHz) range, for example in the region around 10 kHz. By using the stimulation signal 210, the heater 110 generates a thermoacoustic sound wave 140 that propagates through the space 130. The thermoacoustic sound wave 140 moves through the space 130 with a speed of sound. This speed of sound is dependent on the gas or gases, or the concentration of the gases, in the space 130, see for example FIG. 3. The thermal conductivity of the space 130 with the gas or gases may furthermore influence the thermoacoustic sound wave 140. The receiver 120 converts the influenced thermoacoustic sound wave 140 into a reception signal 220. The reception signal 220 is output at the second terminal 310. The analysis of the reception signal 220 is carried out in the gas concentration determination circuit 230.

In the gas concentration determination circuit 230, a phase shift between the reception signal 220 and the heater signal 250 based on the reception signal 220 and the heater signal 250, or a time of flight of the thermoacoustic wave 140 is determined at least based on the reception signal 220.

In the thermal conductivity determination circuit 270, the thermal conductivity of the space, which depends on the gas concentration in the space, is determined based on the heater signal 250. For example, a signal amplitude of the thermoacoustic wave 140 could be determined from the heater signal 250 and compared with the amplitude of the thermoacoustic wave when impinging on the receiver 120, for example with the aid of a temperature sensor in the receiver, in order for example to determine a signal attenuation and the thermal conductivity so as in turn to deduce the gas concentration in the space therefrom.

As an alternative or in addition, it is possible to detect how much heat, or heat power, is dissipated by heat transport from the heater 110 through the space 130, in order to infer the thermal conductivity on the basis thereof. This may be done by comparing the temperature of the heater 110 with a model, which makes it possible to deduce the thermal conductivity. Furthermore, the aforementioned 3 omega method may also be applied.

The results of the gas concentration determination circuit 230 and of the thermal conductivity determination circuit 270 may be processed further in the respective determination circuits, for example in order to determine the gas concentration in the space 130. The results may, however, also be processed further in one or more further circuit parts outside the respective determination circuit. Furthermore, the results for the gas concentration based on the two determination circuits may be correlated in order to determine an overall result, for example using averaging.

Figure 6:
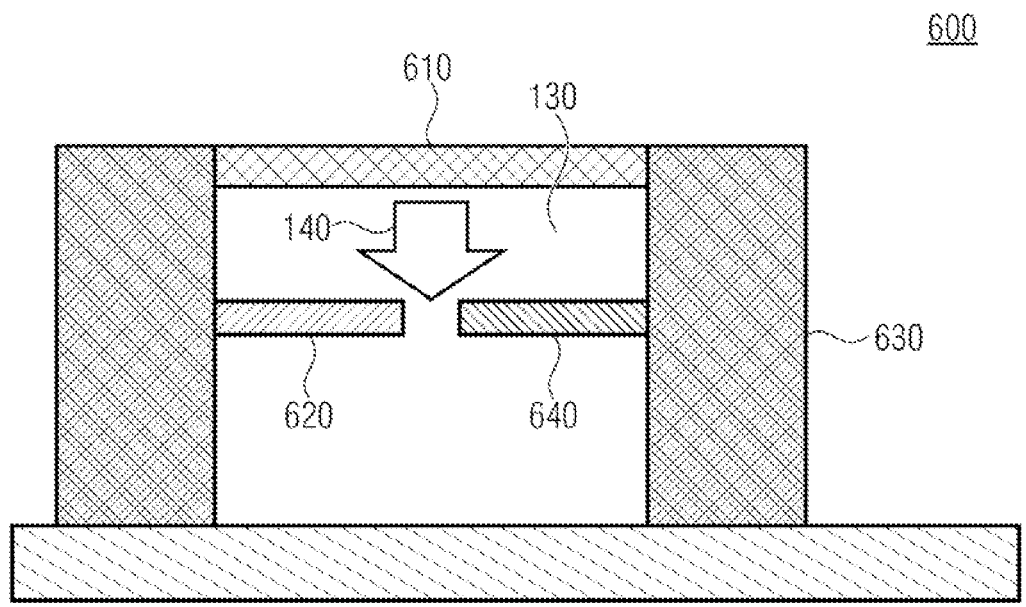
FIG. 6 shows a schematic side view of an example of a gas sensor according to the present disclosure with a microphone membrane.
Figure 7:
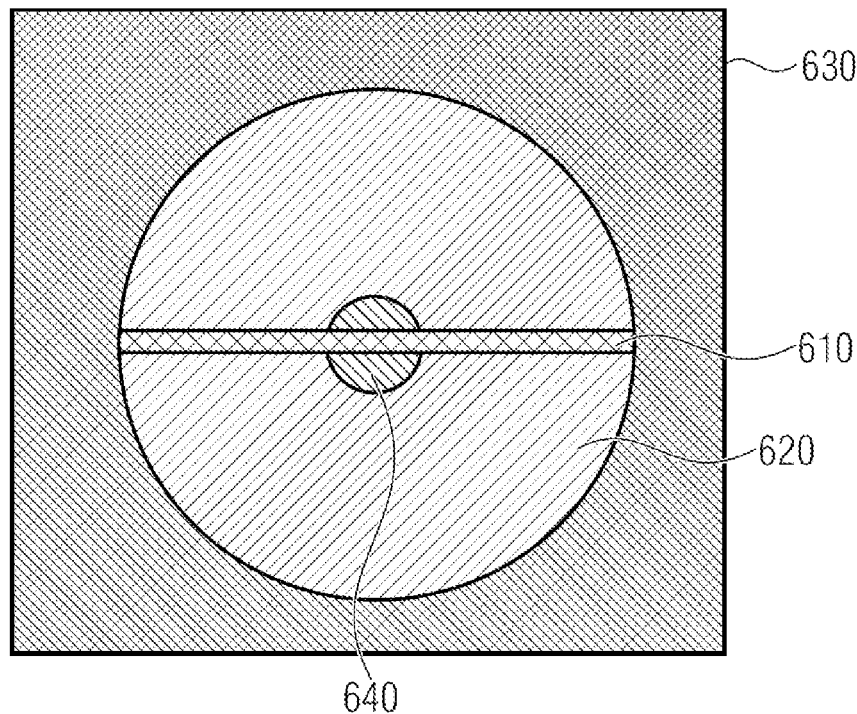
FIG. 7 shows a schematic plan view of the example of the gas sensor in FIG. 6.

FIG. 6 shows a schematic side view of an example of a gas sensor according to the present disclosure with a microphone membrane. FIG. 7 shows a schematic plan view of the example of the gas sensor in FIG. 6.

FIG. 6 and FIG. 7 show a gas sensor 600 having a heater structure 610 and a microphone membrane 620, which are fastened on a supporting structure 630. A heater structure 610 may in this case be an implementation of an above-described heater. A space 130 is arranged between the heater structure 610 and the microphone membrane 620. The supporting structure 630 may be formed by structured and/or unstructured layers of a microsystem or MEMS system. A thermoacoustic wave 140, indicated by an arrow, propagates in the space. The heater structure 610 is configured as a strip formed by a conductive track, although it may also be configured as a membrane. The microphone membrane 620 has a round cross section, with a round opening 640 in the middle. The strip of the heater structure 610 is arranged in such a way that it centrally crosses the opening 640 of the microphone membrane 620.

The heater structure 610 may be heated in an electronically pulsed fashion. By the cyclic heating, the thermoacoustic sound wave 140 is formed in the vicinity of the heater structure 610. The thermoacoustic sound wave 140 is absorbed by the microphone membrane 620, which is integrated in the second plane below the heater structure 610. By using a time-of-flight-dependent shift, such as a phase shift, for example of the thermoacoustic sound wave 140 absorbed by the microphone membrane 620 or of the reception signal, which is dependent on the time of flight of the signal, for example the time of flight of the thermoacoustic sound wave 140, the speed of sound may be derived. By using the speed of sound, a gas or a gas concentration may be deduced. The gas sensor 600 may form a fully integrated sensor system with which it is possible to measure the temperature, the thermal conductivity and the speed of sound inside a gas mixture, for example in the space 130.

Some aspects of the present disclosure, for example using the sensor shown in FIGS. 6 and 7, allow a method having the following features: stimulation of a heater structure 610, for example with a frequency ~10 kHz, generation of a thermoacoustic sound wave 140, propagation of the sound wave with a speed of sound, detection of the sound wave with a microphone membrane 620, or a microphone, determination of a phase offset or a phase shift (for example $<\pi$) or a time of flight or a time-of-flight delay of the acoustic signal dependent on the speed of sound. Besides this, in some examples the sensor may be configured to detect the thermal conductivity and the gas sensor may therefore form a thermal conductivity sensor.

Figure 8:
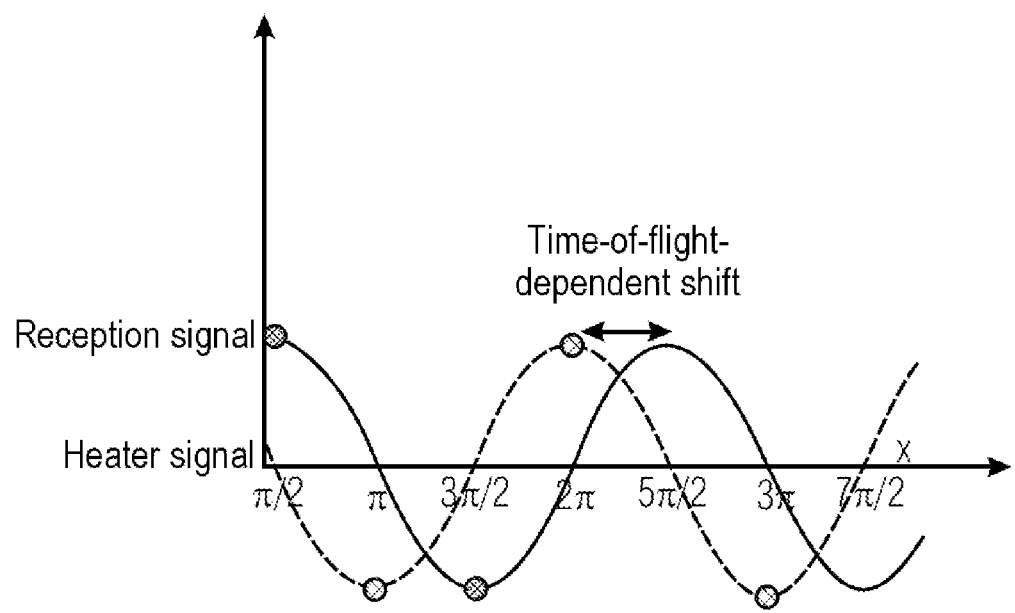
FIG. 8 shows a schematic signal profile of the reception signal and the heater signal according to one example of the present disclosure.

FIG. 8 shows a schematic signal profile of the reception signal and the heater signal according to one example of the present disclosure. The heater signal may in this case be the stimulation signal or the temperature of the heater. The reception signal may be the microphone signal, or the signal absorbed by the microphone membrane, or a further temperature signal, for example, a temperature signal of the receiver, for example, of a temperature sensor that forms the receiver or is part of the receiver. FIG. 8 furthermore shows an example of a time-of-flight-dependent shift, for example, a phase shift, for example $<\pi$, between the stimulation and reception signals.

The time-of-flight-dependent shift may be determined from the heater signal and reception signal, so that the speed of sound of the thermoacoustic wave in the space may in turn be deduced. A gas or a gas concentration in the space may be inferred therefrom.

For the case of a periodic heater signal, as shown in FIG. 8, the time-of-flight-dependent shift may be determined in the form of a phase shift. To this end, the gas concentration determination circuit may comprise a phase detector in order to determine the phase shift from a comparison between the heater signal, for example the form of the stimulation signal, or the temperature of the heater, and the reception signal.

In this case, it should be pointed out that the signal profiles according to FIG. 8 are only example profiles. The heater signal may also be an individual pulse or a sequence of pulses, and the reception signal may be a correspondingly delayed signal. In this case, the time-of-flight-dependent shift may be determined in the form of a signal time of flight, or signal delay. To this end, a comparison of the heater signal and the reception signal may take place in the gas concentration determination circuit. The shift may be determined from the time offset of the two signals.

In some aspects, the reception signal together with time information in the gas concentration determination circuit may be evaluated. The time information may be time information of the heater signal, or, for example, the time at which the thermoacoustic wave is emitted. From the time information or the time of the emission, the time-of-flight-dependent delay may be determined according to the arrival time of the reception signal or the reception signal itself.

Figure 9:
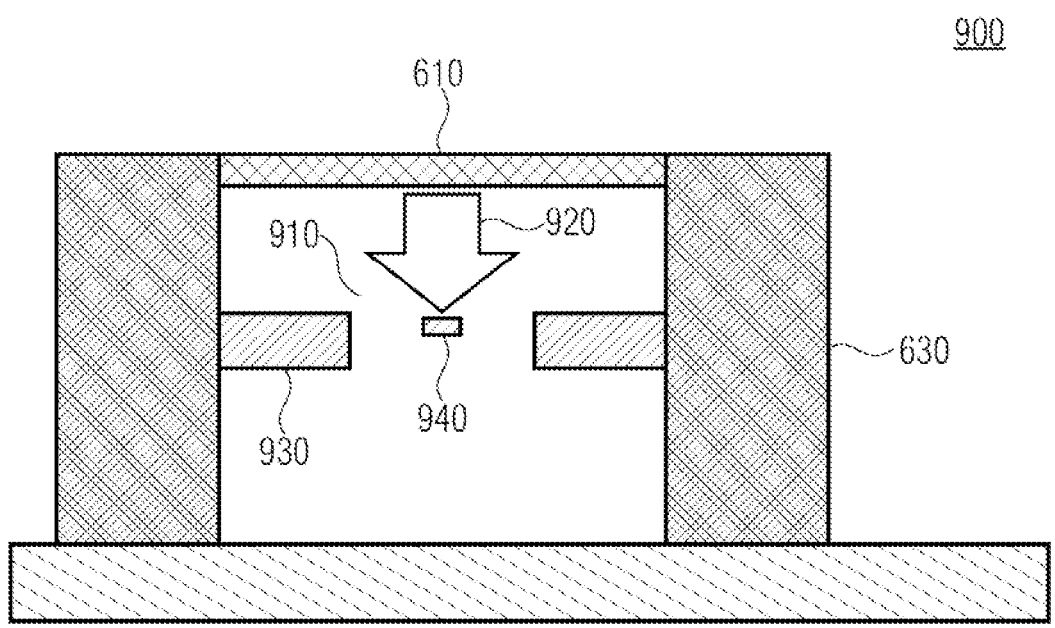
FIG. 9 shows a schematic side view of an example of a gas sensor according to the present disclosure with a temperature sensor.
Figure 10:
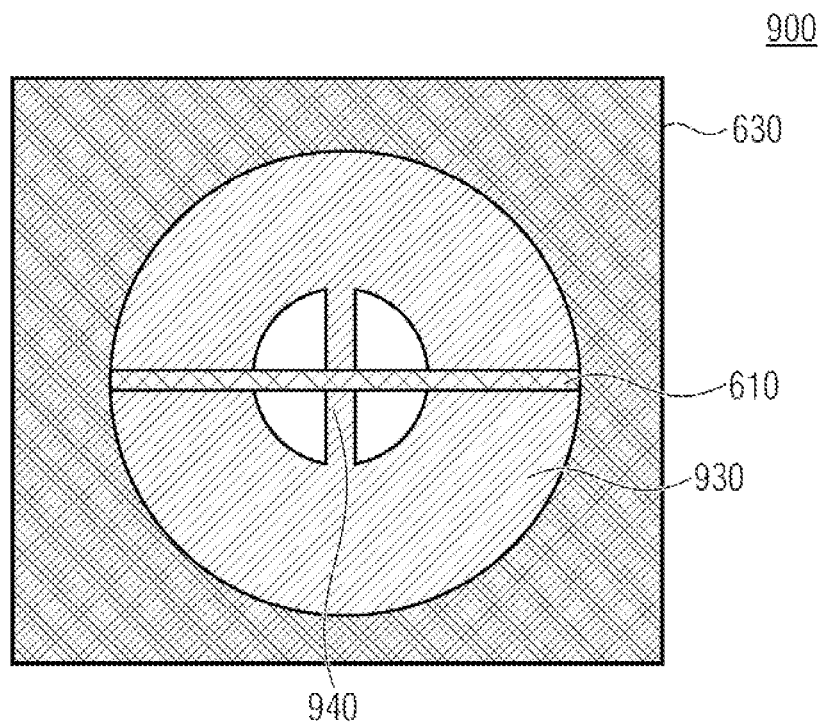
FIG. 10 shows a schematic plan view of the example of the gas sensor in FIG. 9.

FIG. 9 shows a schematic side view of an example of a gas sensor according to the present disclosure with a temperature sensor. FIG. 10 shows a schematic plan view of the example of the gas sensor in FIG. 9.

FIG. 9 and FIG. 10 show a gas sensor 900 having a heater structure 610 and a temperature sensor 910, for example with a thin membrane, which are fastened on a supporting structure 630. A heater structure 610 may in this case be an implementation of an above-described heater, and furthermore the temperature sensor 910 may for example form the above-described receiver or be part of the receiver. The temperature sensor comprises a sensor structure 930 and a sensor element 940. The space 130 is arranged between the heater structure 610 and the temperature sensor 910. The supporting structure 630 may be formed by structured and/or unstructured layers of a microsystem or MEMS system. A thermal sound wave 920, indicated by an arrow, propagates in the space. The heater structure 610 may in this case form a temperature emitter. The temperature sensor 910 has a round cross section, with a round opening in which the sensor element 940 is arranged. The sensor element 940 is configured as a strip and has a temperature-dependent resistance. The heater structure 610 is likewise configured as a strip and is arranged in such a way that the strip of the heater structure 610 centrally crosses the opening of the temperature sensor 910, perpendicularly to the sensor element 940 of the temperature sensor 910.

The temperature sensor 910 or the sensor element 940 may have a low heat capacity and may be used to detect the thermoacoustic sound wave that has propagated through the space. The temperature sensor 910 may furthermore follow the frequency of the temperature emitter, for example the heater structure 610. For example, the heater structure 610 may emit a thermal sound wave 920 when stimulated by a stimulation signal with a particular frequency, so that after the thermal sound wave 920 has passed through the space between the heater structure 610 and the temperature sensor 910, the wave impinges on the temperature sensor 910, the frequency of the reception signal of the temperature sensor corresponding for example to the frequency of the heater structure 610, or of the temperature emitter.

Furthermore, the gas sensor 900 may have a frequency range of from one or a few hertz to 100 kHz, and for example the temperature sensor 910 or the sensor element 940 may follow the temperature emitter 610 only in such a frequency range. Frequency ranges may in this case describe frequencies of the stimulation signal and/or of the reception signal.

The time-of-flight-dependent signal shift or the phase shift and the level of the signal, for example the amplitude of the signal, for example of the reception signal or temperature signal at the temperature sensor, for example, between the temperature emitter and the temperature sensor, is dependent on the thermal conductivity of the gas and furthermore dependent on pressure and temperature.

Therefore, for example, with a known pressure and known temperature, a gas or the concentration of the gas in the space may be deduced using the relationship with the thermal conductivity, for example, according to FIG. 5.

Some aspects of the present disclosure, for example using the sensor shown in FIGS. 9 and 10, allow a method having the following features: stimulation of a heater structure 610, for example with a frequency ~10 kHz, generation of a thermal sound wave 920, propagation of the thermal sound wave with a speed of sound, detection of the sound wave with the temperature sensor 910 and/or with the sensor element 940, determination of a phase offset or a phase shift (for example <π) or a time of flight or a time-of-flight delay of the acoustic signal dependent on the speed of sound.

A gas sensor according to FIG. 9 and FIG. 10 may allow a simple structure of the gas sensor, so that the gas sensor may for example advantageously be less complicated, for example with a view to manufacturing or fault susceptibility, for example in comparison with the proposed structure of FIGS. 6 and 7.

All lists mentioned herein of materials, environmental influences, electrical properties and optical properties are in this case to be regarded as example and not exhaustive.

ASPECTS

Very generally, some aspects of the present disclosure provide gas sensors having a plurality of fundamental physically-based, and for example therefore very robust, measurement methods. Furthermore, these measurement methods, or elements according to the disclosure of gas sensors, may be connected based on these measurement methods in a microsystem or a MEMS chip. Some aspects according to the present disclosure furthermore allow high integration, or a high level of integration, and the combination of a plurality of measurement principles.

Some aspects of the present disclosure make it possible to reduce systems, for example of gas sensors, to a minimum, for example in respect of sizes or manufacturing and/or integration outlay. For example, complex PCS-based constructions may be integrated by the gas sensor according to the disclosure into a chip package.

Very generally, some aspects according to the present disclosure provide gas sensors in which a thermoacoustic sound wave that is generated during the measurement of the thermal conductivity is simultaneously used to measure the speed of sound.

Some aspects according to the present disclosure provide systems, for example integrated systems, for example, systems having an integrated or partially integrated gas sensor, which may be constructed to be small, for example, with small dimensions or sizes, and may have a low complexity.

Some aspects according to the present disclosure provide gas sensors which comprise a heater structure which is stimulated by using a stimulation signal, for example with a high frequency, to emit a thermoacoustic wave and in which the thermoacoustic wave passes through a space having a gas concentration to be detected. Subsequently, in some aspects the thermoacoustic wave is converted by a receiver into a reception signal which is evaluated both in respect of the thermal conductivity and the speed of sound of the gas-filled space. As an alternative, in some aspects the reception signal may be evaluated only in respect of the speed of sound and a determination of the thermal conductivity is carried out based on the heater signal, which may comprise the stimulation signal of the heater structure or its temperature.

In some aspects according to the present disclosure, the 3 omega method may be used to determine the thermal conductivity, for example in addition to a determination according to the disclosure of the speed of sound of the thermoacoustic wave.

Very generally, in some aspects according to the present disclosure, in order to determine the thermal conductivity a predetermined power is applied to the heating structure and a temperature is measured. The temperature measured in this case depends on the gas concentration.

Some aspects of the present disclosure provide robust H2 sensors.

Some aspects of the present disclosure provide gas sensors that are based on the combination of a determination of a thermal conductivity and of a speed of sound, by using a thermoacoustic sound wave.

In some aspects, a processing circuit, for example the gas concentration determination circuit or the thermal conductivity determination circuit, may be implemented by any desired suitable circuit structures, for example, microprocessor circuits, ASIC circuits, CMOS circuits and the like. In some aspects, the processing circuit may be implemented as a combination of hardware structures and machine-readable instructions. For example, the processing circuit may comprise a processor and a memory device, which store machine-readable instructions that provide the described functionalities and lead to the conduct of methods described herein when they are run on the processor. In some aspects, the memory device may be implemented by any desired suitable memory units, for example, ROM, PROM, EPROM, EEPROM, flash memories, FRAM (ferroelectric RAM), MRAM (magnetoresistive RAM), or phase-change RAM.

IMPLEMENTATION ALTERNATIVES

Although many aspects have been described in connection with a device, it is to be understood that these aspects also represent a description of the corresponding method, so that a block or a component of a device is also to be understood as a corresponding method step or as a feature of a method step. Similarly, aspects which have been described in connection with or as a method step also represent a description of a corresponding block or detail or feature of a corresponding device. Some or all of the method steps may be carried out by hardware apparatus (or by using hardware apparatus), for example a microprocessor, a programmable computer or an electronic circuit. In some examples, individual or several of the most important method steps may be carried out by such apparatus.

The aspects described above merely represent an illustration of the principles of the present implementation. It is to be understood that modifications and variations of the arrangements and details described herein will be clear to other persons skilled in the art. It is therefore intended that the implementation be restricted only by the protective scope of the appended patent claims and not by the specific details that have been presented herein with the aid of the description and the explanation of the examples.

What is claimed is:

1. A gas sensor comprising:
a heater,
a receiver, and
a space arranged between the heater and the receiver, the heater being configured to generate a thermoacoustic sound wave propagating through the space by using a stimulation signal, and
the receiver being configured to receive the thermoacoustic sound wave that has propagated through the space and to convert the thermoacoustic sound wave into a reception signal that has a time-of-flight-dependent shift with respect to the stimulation signal and therefore information relating to a gas concentration in the space.

2. The gas sensor as claimed in claim 1, wherein the receiver comprises a microphone.

3. The gas sensor as claimed in claim 1, wherein the receiver comprises a temperature sensor.

4. The gas sensor as claimed in claim 1 further comprising:
a gas concentration determination circuit that is configured to determine:
a phase shift between the reception signal and a heater signal, or
based on the reception signal, a time of flight of the thermoacoustic sound wave through the space, which are respectively a measure of the gas concentration in the space.

5. The gas sensor as claimed in claim 4, wherein the heater signal is the stimulation signal or a temperature signal that indicates a temperature of the heater.

6. The gas sensor as claimed in claim 5, wherein an electrical resistance of the heater is temperature-dependent, the gas sensor being configured to generate the temperature signal as a function of the electrical resistance of the heater.

7. The gas sensor as claimed in claim 1, which furthermore comprises a thermal conductivity determination circuit that is configured to determine the thermal conductivity of the space based on the heater signal.

8. The gas sensor as claimed in claim 1 further comprising a driver circuit that is configured to apply the stimulation signal to the heater.

9. The gas sensor as claimed in claim 1, wherein at least the heater, the receiver, and the space arranged between the heater and the receiver, are integrated into a microsystem or a MEMS system.

10. The gas sensor as claimed in claim 9, wherein the microsystem or the MEMS system comprises a first terminal for application of the stimulation signal to the heater and a second terminal for output of the reception signal.

11. The gas sensor as claimed in claim 9, wherein the heater is arranged on a first side of a cavity in the microsystem or the MEMS system, and the receiver comprises a membrane that is arranged at a distance from the heater on a second side of the cavity in the microsystem or the MEMS system.

12. A method for determining a gas concentration, comprising:
applying a stimulation signal to a heater to generate a thermoacoustic sound wave that propagates through a space arranged between the heater and a receiver,
receiving the thermoacoustic sound wave at the receiver to generate a reception signal,
determining a time-of-flight-dependent shift between a heater signal and the reception signal, and
determining a gas concentration in the space based on the time-of-flight-dependent shift.

13. The method as claimed in claim 12, wherein the heater signal is a periodic signal and determining of the time-of-flight-dependent shift comprises determining a phase shift between the reception signal and the heater signal.

14. The method as claimed in claim 12, wherein determining the time-of-flight-dependent shift comprises determining a time of flight of the thermoacoustic sound wave through the space.

15. The method as claimed in claim 12, wherein the heater signal is the stimulation signal that indicates a temperature of the heater or a temperature signal that indicates the temperature of the heater.

16. The method as claimed in claim 15, wherein an electrical resistance of the heater is temperature-dependent, and the temperature signal is generated as a function of the electrical resistance of the heater.

17. The method as claimed in claim 12, which furthermore comprises determining a thermal conductivity of the space based on the heater signal.

* * * * *